United States Patent [19]

Hefner

[11] Patent Number: 4,457,104
[45] Date of Patent: Jul. 3, 1984

[54] PLANT POT

[76] Inventor: Boby R. Hefner, P.O. Box 311, Coleman, Tex. 76834

[21] Appl. No.: 109,629

[22] Filed: Jan. 4, 1980

[51] Int. Cl.³ ............................................. A01G 23/02
[52] U.S. Cl. ........................................... 47/73; 47/77
[58] Field of Search ................... 47/66, 71, 73, 74, 75, 47/76, 77, 78, 84, 85, 86, 87; 229/20, DIG. 13; 220/93, DIG. 10; 206/815, 39.4, 39.5, 531, 551, 532, 85, 96, 229, 249–255, 804, 825, 525, 527; 249/74, 76, 113

[56] References Cited

U.S. PATENT DOCUMENTS

| 861,046 | 7/1907 | Norum | 47/73 |
| 3,174,940 | 3/1965 | Lacoste | 47/66 X |
| 3,362,530 | 1/1968 | Johnson | 206/804 |

FOREIGN PATENT DOCUMENTS 2249481 4/1973 Fed. Rep. of Germany .......... 47/87
2729454 1/1978 Fed. Rep. of Germany .......... 47/73

Primary Examiner—James R. Feyrer
Attorney, Agent, or Firm—Wofford, Fails & Zobal

[57] ABSTRACT

A pot for holding a plant or the like comprising a one piece container molded of plastic and having a bottom with side walls extending therefrom defining an open top end. An elongated narrow opening is formed in the bottom in a configuration defining a central tab extending from one side of an outer portion and which may be pushed inward into the container to remove the plant and its potting soil. The plastic employed to form the container is pliable or flexible such that the central tab may be pushed inward without breaking the central tab from the outer portion of the bottom.

28 Claims, 2 Drawing Figures

PLANT POT

FIELD OF THE INVENTION

The present invention relates to a pot for holding plants or the like.

DESCRIPTION OF THE PRIOR ART

In the nursery business, many types of plants such as house plants or garden plants are started in small plastic containers and then replanted for growing purposes either by the nursery or buyer. The prior art containers are generally formed of a brittle plastic such as styrene. The bottoms of the containers have apertures formed therethrough for drainage purposes. It is difficult, if not impossible, to remove a plant and its potting soil from the prior art containers without breaking the containers or damaging the root system of the plant.

SUMMARY OF THE INVENTION

It is an object of the present invention to provide a pot for holding a plant or the like and which readily allow the plant and its potting soil to be removed without breaking the pot or damaging the root system of the plant. Thus the pot can be reused many times.

The pot comprises a one piece container formed of plastic and which comprises a bottom with side wall means extending from said bottom defining an open top end. An elongated narrow opening is formed in the bottom in a configuration which defines a tab extending from one side of an outer portion of the bottom and which may be pushed inward into the container to remove the plant and its potting soil or the like from the container. The plastic used to form the container is pliable or flexible such that the tab may be pushed inward without breaking the central tab from the outer portion of the bottom.

In the embodiment disclosed, the narrow opening substantially surrounds the tab and has two ends which are located close to each other defining a narrow portion therebetween which connects the tab to the outer portion and which acts as a hinge for the tab.

DESCRIPTION OF THE PREFERRED EMBODIMENTS

Figure 1:
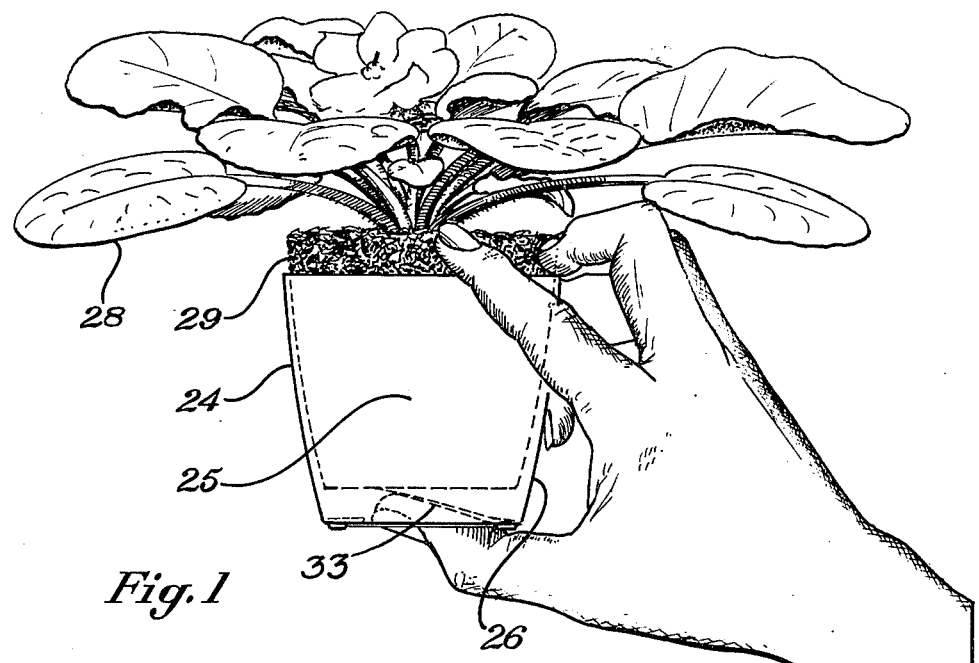
FIG. 1 illustrates a plant and its potting soil being removed from the pot of the present invention.
Figure 2:
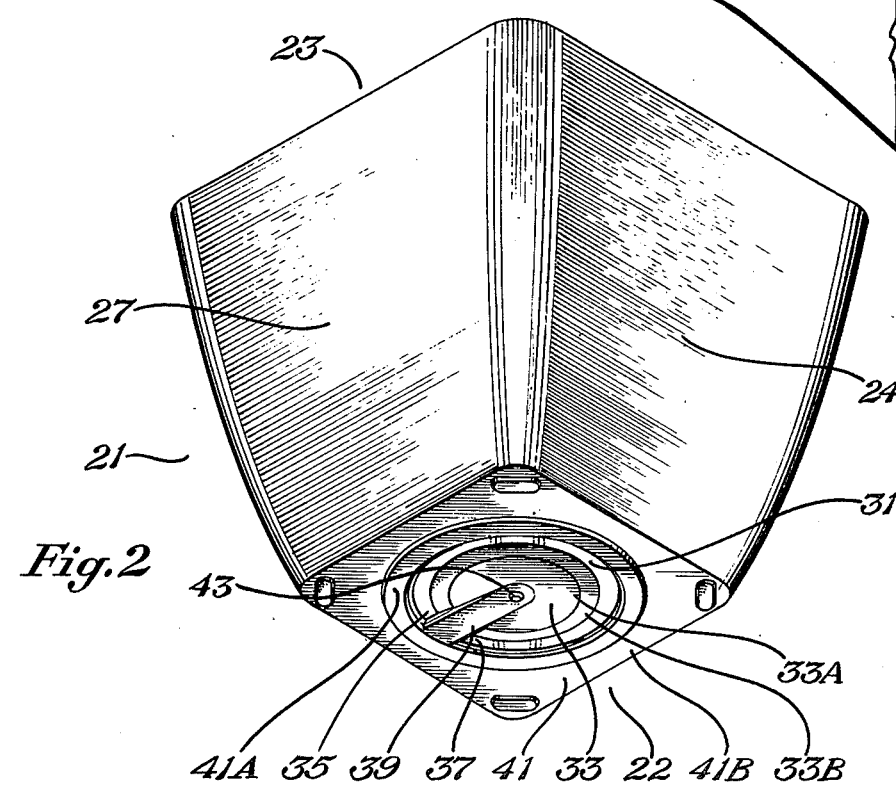
FIG. 2 is a perspective view of the pot of the present invention.

Referring to FIGS. 1 and 2 of the drawings, the pot of the present invention is identified at 21. It comprises a one piece container which is injection molded from polyethylene or polypropylene which is a pliable, flexible plastic. The container comprises a square bottom 22 having four side walls extending therefrom which extend upward and outward to define an open top end 23. The four side walls are identified at 24, 25, 26 and 27. The container is employed for holding a plant and its potting soil illustrated at 28 and 29 respectively.

A narrow ring shaped opening 31 is formed in the bottom which defines a central tab 33 circular in shape. The ends 35 and 37 of the opening 31 extend close together defining a narrow portion 39 therebetween which connects the tab 33 with the outer portion 41 of the bottom. The outer portion 41 of the bottom surrounds the opening 31 and the tab 33. As can be seen, the narrow connecting portion 39 extends from only one side of the outer portion 41 and acts as a hinge for the tab. When it is desired to remove the plant 27 and its potting soil 29 one merely has to push inward on the tab 31 to move it into the container as shown in FIG. 1. This causes the potting soil and the plant to be pushed out of the container whereby the soil and plant may be removed from the container without damaging the root system of the plant. Since the plastic is flexible and pliable, the tab 33 will not break off from the outer portion 41 of the bottom when it is pushed inward. After the plant and its potting soil is removed, the tab may be moved back to its normal position in the plane of the bottom as shown in FIG. 2 whereby the container or pot may be reused.

In one embodiment, each of the four edges of the bottom 22 has a dimension of about 2 inches, the height of the pot is about 2½ inches and each of the top edges of the four side walls has a dimension of about 2¾ inches. The four side walls each have a thickness of about 1/32 of an inch. The central portion 33A of tab 33 has a thickness of about 1/32 of an inch. The outer rim 33B is thinner. The connecting portion 39 increases in thickness outward and joins a surrounding rim 41A of the outer portion 41 which defines the outer limits of the opening 31. The thickness of the rim 41A is about 1/16 of an inch. The bottom portion 41B outward of rim 41A has a thickness of about 1/32 of an inch. The diameter of the circular tab 33 is about one inch. The opening 31 has a width of about ⅛ of an inch and the connecting portion 39 has a width of about 5/16 of an inch. The tab 33 may be pushed inward until it touches side wall 26 without breaking the connecting portion 39. The connecting portion 39 and the tab 33 are strong enough to support a plant and its potting soil in the container without being bent outward. The opening 31 allows sufficient drainage of water yet does not allow too much drainage. Moreover, it allows little if any potting soil to fall out of the container through the opening.

The interior of the mold employed to form the container 21 is thicker at the position of the rim 41A to facilitate the molding process. In the molding process, the liquid plastic is injected at the center point 43 from which it flows to form the tab 33 and the outward by way of a passage which defines the connecting portion 39. From this passage, the liquid plastic flows around the thicker space which defines the rim 41A. After the plastic flows around the thicker space which defines the rim 41A, it flows evenly outward in all directions to form the remaining bottom portion 41B and the four side walls to the same desired thickness. Thus the thicker portion of the mold at the position of the rim 41A allows the desired container to be formed even though only one narrow connecting portion 39 is employed to connect the center tab to the outer portion 41B of the bottom.

It is to be understood that the container 21 may have other sizes than that described. In addition, the container 21 may have other shapes than that described. For example, bottom 22 may be round whereby the container is round in cross section. Moreover, the tab 33 may have a configuration other than circular. For example, the tab 33 may be rectangular. In this embodiment, the narrow opening 31 also will be rectangular and will substantially surround the tab 33 with the connecting portion 39 extending to one side of the tab from the rim of the outer portion of the bottom. In another embodiment, the tab 33 could be half round with the narrow opening 31 also half round. In this embodiment, the connecting portion 39 will be as wide as the tab and the rim will surround the narrow opening and the tab.

I claim:

1. A pot for holding a plant or the like comprising:
a one piece container formed of plastic and comprising a bottom and side wall means extending from said bottom defining an open top end,
a narrow opening formed in said bottom in a configuration defining a tab extending from one side only of an outer portion of said bottom and which may be pushed inward into said container to remove the plant and its potting soil or the like from said container,
said plastic being characterized such that said tab may be pushed inward without breaking said tab from said outer portion.

2. The pot of claim 1 wherein:
said narrow opening substantially surrounds said tab and has two ends which are located close to each other defining a narrow portion therebetween which connects said tab to said outer portion,
said narrow portion acting as a hinge for said tab.

3. The pot of claims 1 or 2 wherein:
said tab is solid.

4. The pot of claim 1 or 2 wherein:
said outer portion surrounds said narrow opening and said tab.

5. The pot of claims 1 or 2 wherein:
said tab is solid,
said outer portion surrounds said narrow opening and said tab.

6. The pot of claim 2 wherein:
said tab is circular in shape and is formed centrally of said bottom,
said narrow opening being circular in shape.

7. The pot of claim 6 wherein:
said container is molded of a plastic which is pliable or flexible,
said outer portion surrounds said narrow opening and said tab of said bottom,
said outer portion of said bottom comprises an annular rim and a portion outward of said rim,
said rim defining the outer limits of said narrow opening,
said rim having a thickness greater than that of said portion outward of said rim.

8. The pot of claim 7 wherein:
said bottom is generally rectangular in shape.

9. The pot of claims 6 or 7, wherein: said narrow opening defines more than 270° of a circle concentric to a line passing through the center of said tab and which line is perpendicular to the plane of said tab.

10. The pot of claim 6 or 7, wherein:
said narrow portion extends only radially from said tab to said outer portion.

11. The pot of claim 1, wherein:
said narrow opening substantially surrounds said tab and has two ends which are located close to each other defining a narrow portion therebetween which connects said tab to said outer portion,
said narrow portion being the only connection between said tab and said outer portion.

12. The pot of claim 11, wherein:
said narrow opening defines more than 270° of a circle concentric to a line passing through the center of said tab and which line is perpendicular to the plane of said tab.

13. The pot of claim 7, wherein:
said narrow portion extends radially from about the center of said tab to said annular rim,
said narrow portion gradually increasing in thickness in a plane perpendicular to said bottom from about the center of said tab to said annular rim.

14. The pot of claim 13, wherein:
said narrow portion is the only connection between said tab and said outer portion.

15. The pot of claim 13 or 14, wherein: said narrow opening defines more than 270° of a circle concentric to a line passing through the center of said tab and which line is perpendicular to the plane of said tab.

16. The pot of claim 1, wherein:
the connection of said tab with said outer portion defines a hinge about which said tab turns as said tab is pushed inward,
the angle between said tab and said bottom changing as said tab is pushed inward.

17. A pot for holding a plant or the like, comprising:
a one piece container formed of plastic and comprising a bottom and side wall means extending from said bottom defining an open top end,
a narrow opening formed in said bottom in a configuration defining a tab extending from one side of an outer portion of said bottom and which may be pushed inward into said container to remove the plant and its potting soil or the like from said container,
said plastic being characterized such that said tab may be pushed inward without breaking said tab from said outer portion,
said narrow opening having two ends which are located relatively close to each other defining a narrow portion therebetween which connects said tab to said outer portion,
said narrow portion being the only connection between said tab and said outer portion.

18. The pot of claim 17, wherein:
said narrow opening substantially surrounds said tab.

19. The pot of claims 17 or 18 wherein:
said tab is circular in shape,
said narrow opening is circular in shape,
said narrow portion extends only radially from said tab to said outer portion.

20. The pot of claim 17, wherein:
said tab is circular in shape,
said narrow opening is circular in shape,
said narrow opening defines more than 270° of a circle concentric to a line passing through the center of said tab and which line is perpendicular to the plane of said tab.

21. The pot of claim 20, wherein:
said narrow portion extends only radially from said tab to said outer portion.

22. The pot of claims 17 or 18, wherein:
said narrow portion defines a hinge about which said tab turns as said tab is pushed inward,
the angle between said tab and said bottom changing as said tab is pushed inward.

23. A pot for holding a plant or the like, comprising:
a one piece container formed of plastic and comprising a bottom and side wall means extending from said bottom defining an open top end,
a circular shaped narrow opening formed in said bottom defining a circular shaped tab extending from one side of an outer portion of said bottom and which may be pushed inward into said container to remove the plant and its potting soil or the like from said container, said plastic being characterized such that said tab may be pushed inward without breaking said tab from said outer portion, said circular shaped narrow opening having two ends which are located relatively close to each other defining a narrow portion therebetween which connects said tab to said outer portion, said narrow portion extending only radially from said tab to said outer portion.

24. The pot of claim 23, wherein:
said circular shaped narrow opening substantially surrounds said tab.

25. The pot of claims 23 or 24, wherein:
said circular shaped narrow opening defines more than 270° of a circle concentric to a line passing through the center of said tab and which line is perpendicular to the plane of said tab.

26. The pot of claim 23, wherein:
said narrow portion is the only connection between said tab and said outer portion.

27. The pot of claims 23 or 26, wherein:
said narrow portion defines a hinge about which said tab turns as said tab is pushed inward,
the angle between said tab and said bottom changing as said tab is pushed inward.

28. A pot for holding a plant or the like, comprising:
a one piece container formed of plastic comprising a bottom and side wall means extending from said bottom defining an open top end,
a narrow opening formed in said bottom in a configuration defining a tab extending from one side of an outer portion of said bottom and which may be pushed inward into said container to remove the plant and its potting soil or the like from said container,
said plastic being characterized such that said tab may be pushed inward without breaking said tab from said outer portion,
the connection of said tab with said outer portion defining a hinge about which said tab turns when said tab is pushed inward,
the angle between said tab and said bottom changing as said tab is pushed inward.

* * * * *